INVENTOR
VERNON J. HURST

United States Patent Office 3,769,383
Patented Oct. 30, 1973

3,769,383
HYDROTHERMAL TRANSFORMATION
OF KAOLIN
Vernon J. Hurst, 445 Westview Drive,
Athens, Ga. 30601
Continuation-in-part of abandoned application Ser. No.
843,556, July 22, 1969. This application July 26, 1971,
Ser. No. 166,291
Int. Cl. C01b 33/26
U.S. Cl. 423—328
13 Claims

ABSTRACT OF THE DISCLOSURE

By the hydrothermal transformation of kaolin it is possible to produce a variety of alumino-silicate products.

This application is a continuation-in-part application of Ser. No. 843,556, filed July 22, 1969, now abandoned.

CROSS-REFERENCES TO RELATED APPLICATIONS

A co-pending application, Ser. No. 843,535, filed July 22, 1969, entitled "Continuous Hydrothermal Apparatus and Process," filed of even date with the present application by the present inventor describes a specific apparatus useful for carrying out the hydrothermal transformations of the present application.

BACKGROUND OF THE INVENTION (1) Field of the invention

The present invention relates to the production of hydrothermal transformations and more particularly to the production of alumino-silica products by the hydrothermal decomposition and transformation of kaolin.

(2) Description of the prior art

While there are large deposits of many aluminum silicate minerals, e.g., kaolinite ($Al_2O_3 \cdot 2SiO_2 \cdot 2H_2O$) the chief constituent of industrial kaolin clays, a number of alumino-silica materials, such as hydralsite $$(2Al_2O_3 \cdot 2SiO_2 \cdot H_2O)$$

are not found in nature. Further, while alumino-silica materials such as pyrophyllite ($2Al_2O_3 \cdot 8SiO_2 \cdot 2H_2O$), andalusite ($Al_2SiO_5$) and mullite ($3Al_2O_3 \cdot 2SiO_2$) are natural products of the metamorphism of argillaceous rocks, there is presently no known process for obtaining these materials in a pure and uncontaminated form. There is no general and convenient process for producing these materials commercially from a single low cost starting material. For example, the production of mullite according to the teaching of the prior art requires temperatures in excess of 1000° C.

SUMMARY OF THE INVENTION

In accordance with the present invention, there is provided a unique method for preparing alumino-silica materials, such as hydralsite, not found in nature, as well as alumino-silica materials which are present in nature but which no known or satisfactory method for preparing same is available. Stated broadly, in accordance with the present invention a variety of alumino-silica materials are produced by the hydrothermal decomposition and transformation of kaolinite at temperatures greater than 430° C. While the products of the present invention are useful in many applications, they have particular utility as coating and reinforcing pigments and as ceramic materials.

It is accordingly a general object of this invention to provide a unique process for producing aluminum silicate minerals.

Another and more particular object is to provide a process for producing a variety of alumino-silica products by the hydrothermal decomposition and transformation of kaolin.

Yet another object is to provide a process for hydrothermally decomposing and transforming kaolinite into a variety of desired alumino-silicate products or combination of same.

BRIEF DESCRIPTION OF THE DRAWINGS

The manner in which the foregoing and other objects are achieved in accordance with the present invention will be better understood in view of the following detailed description and accompanying drawings which form a part of the specification and wherein.

DESCRIPTION OF THE PREFERRED EMBODIMENT(S)

As generally described above, the present invention is based on the finding that unexpected alumino-silica materials such as andalusite can be prepared by the hydrothermal transformation of kaolinite under the conditions as described herein. In this regard it has been found that when kaolinite is subjected to hydrothermal treatment at temperatures greater than 430° C. and at pressures on the order of approximately 4,000 to 30,000 p.s.i. for a period of at least 30 minutes the kaolinite is decomposed and transformed into one or a combination of alumino-silica materials, depending upon the particular temperature and retention times employed. In general, the specific pressure applied is not critical as indicated by the broad operative range above.

A truly remarkable feature of the present invention is the ease of control in obtaining a desired alumino-silica material, e.g., a hydrothermal transformation product containing at least 90% hydralsite can be prepared by hydrothermally treating a kaolinite slurry, in the manner described in more detail hereinafter, at a temperature of approximately 440° C. and for a period of 28 hours. As will be illustrated by the examples set forth below, the temperature employed is critical in the sense that an increase of temperature on the order of, e.g., 30° C. greatly reduces the time required for producing a given product as well as permitting the production of different transformation products.

Further, it has been found, again depending upon the particular temperature employed, that the alumino-silica materials prepared in accordance with this invention may contain a mixture of said materials. However, the various phases produced by the hydrothermal decomposition can be separated in accordance with known physical-chemical techniques, in contrast to the complex procedures required in separating such minerals from naturally occurring clay deposits.

Figure 1:
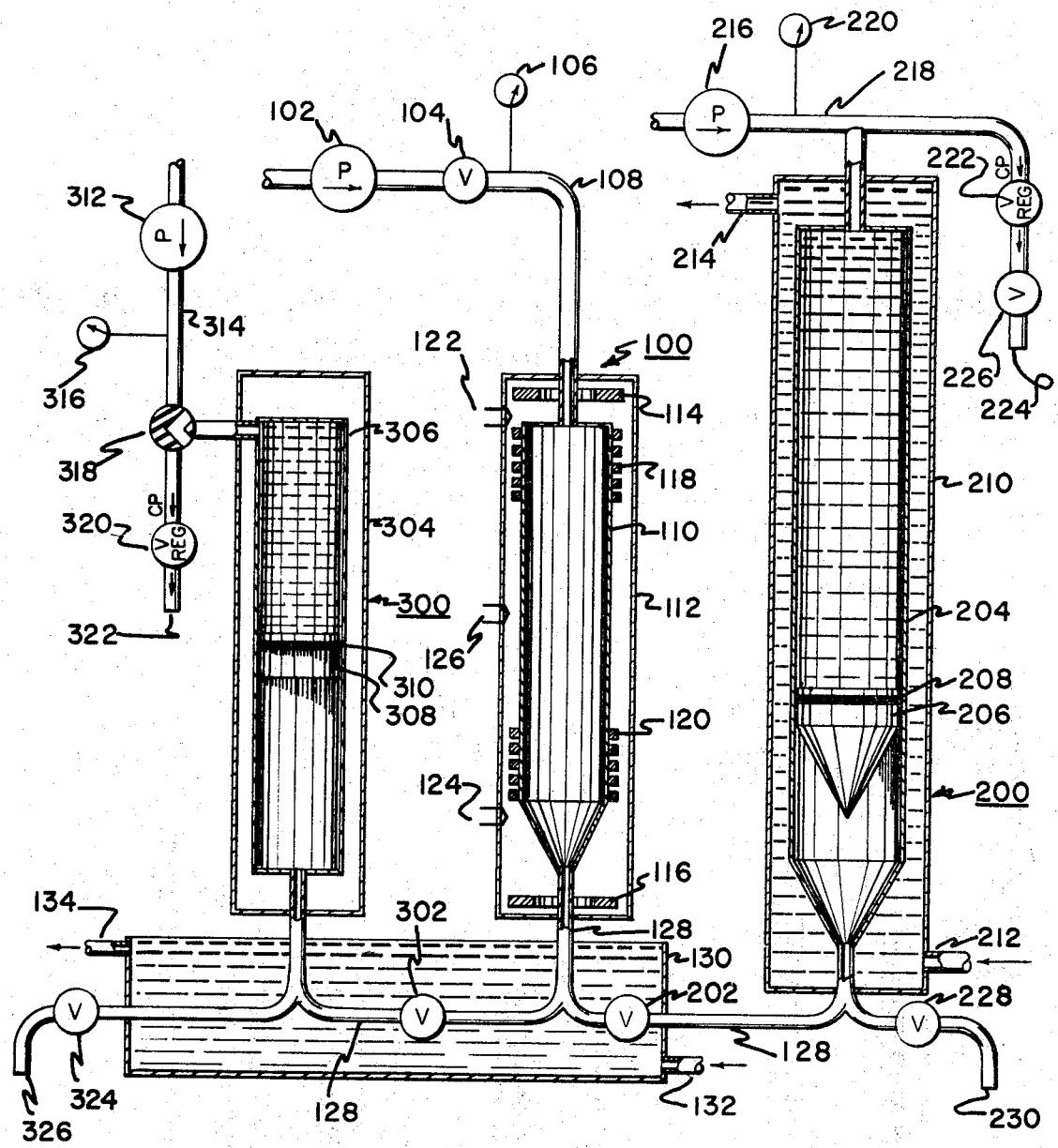
FIG. 1 is a partial cross-sectional schematic representation of a hydrothermal reaction apparatus suitable for carrying out a method embodiment of the present invention.

Turning now to the drawings in detail and first to FIG. 1, there is shown a particularly advantageous arrangement of apparatus for carrying out a method embodiment of the present invention. With reference to FIG. 1 a central hydrothermal reactor is indicated generally at 100. One of a plurality of condenser-exchanges is indicated at 200 while another condenser-exchanger is indicated at 300.

A high pressure pump 102 serves to feed a slurry through valve 104, passed pressure gauge 106 via tubing 108 into a hydrothermal reaction vessel 110 having a volume of approximately 175 cubic centimeters inside of insulated jacket 112 of the hydrothermal reactor 100.

The hydrothermal reaction vessel 110 may be heated by circular end heaters 114 and 116 having a power of 1000 watts each and by five strip heaters 118 having a power of 500 watts each at the top and by five additional strip heaters 120 having a power of 500 watts each at the bottom.

The temperature of the hydrothermal reaction vessel 110 may be measured by thermocouples 122, 124 and 126 placed as shown in the accompanying figure. The temperature of the hydrothermal reaction vessel 110 may be adjusted in response to the readings of the thermocouples 122, 124, and 126 by adjusting the power applied to each of the heating elements making up 114, 116, 118, and 120.

Tubing 128 serves to transport slurry to either condenser-exchanger 200 through valve 202 or to condenser-exchanger 300 through valve 302.

Tank 130 is provided with circulating water for cooling tubing 128 and valves 202 and 302 by means of inlet 132 and outlet 134.

Condenser-exchanger 200 comprises an inner condenser-exchanger vessel 204 having a volume of approximately 4360 cubic centimeters. Within the inner condenser-exchanger vessel 204 is a movable plunger 206 which is sealed to the walls of the inner condenser-exchanger vessel 204 by rings 208 having the same coefficient of thermal expansion as the walls of the inner condenser-exchanger vessel 204.

Inner condenser-exchanger is water cooled by a flow of water between the walls of water jacket 210 and the outer walls of inner condenser-exchanger vessel 204. The flow of water within the water jacket 210 is maintained by a flow through inlet 212 and out of outlet 214.

A high pressure water pump 216 may be employed to force water through tubing 218 past pressure gauge 220 to produce pressure against the top surface of plunger 206.

A constant inlet pressure needle valve 222 on tubing 218 may be utilized to bleed-off water in the upper portion of condenser-exchanger vessel 204. The flow of the water discharge through water discharge outlet 224 on tubing 218 may be further controlled by valve 226.

The discharge of reacted slurry may be controlled by valve 228 prior to slurry discharge outlet 230.

Tubing 128 also allows for the passage of slurry through valve 302 to condenser-exchanger 300 which also may have a water jacket 304 on the outside of an inner condenser-exchanger vessel 306 having a volume of approximately 245 cubic centimeters.

Within the inner condenser-exchanger vessel 306 is a movable plunger 308 which is sealed to the walls of the inner condenser-exchanger vessel 306 by sealing rings 310 having a like coefficient of linear expansion to that of the walls of inner condenser-exchanger vessel 306.

A high pressure water pump 312 may be utilized to force water through tubing 314 past pressure gauge 316 and through valve 318 into the top of inner condenser-exchanger vessel 306 applying pressure to the top of plunger 308.

Water may be bled off through valve 318 and through constant inlet pressure needle valve 320 to water discharge outlet 322.

Reacted slurry may be discharged through valve 324 through the slurry discharge outlet 326.

The reactor vessels and fixtures are preferably constructed of titanium aluminum alloys noted for their strength, stability and resistance to corrosion under the operating conditions of temperature and pressure. The condenser-exchanger vessels may be made of stainless steel. However any suitable material exhibiting the strength, stability and corrosion resistance required under the operating conditions of temperature and pressure may be employed. Typical materials illustrating high strength and corrosion resistance under high temperature and pressure operating conditions are titanium, aluminum, titanium-aluminum alloys, titanium-aluminum-vanadium alloys, Waspaloy and 404 stainless steel.

The control of heat input and of operating pressures may be automatically controlled to the extent desired and warranted by the economics of commercial operations.

In operation, the central hydrothermal reaction vessel 110 is heated to temperatures up to 1000° C. by means of end heaters 114 and 116 and strip heaters 118 and 120 while the chamber of the reaction vessel 110 is filled with water from high pressure pump 102 passing through tubing 108 and valve 104. The reactor vessel 110 is brought to operating conditions of temperature up to approximately 1000° C. and pressures on the order of and up to 30,000 pounds per square inch before any further processing on a slurry is begun.

A slurry of kaolinite typically containing from 5 to 60% by weight solids is then pumped into the reaction vessel 110 by the high pressure pump 102, through valve 104. The pressure is monitored by pressure gauge 106 and maintained at a steady value both during the introduction of the slurry and throughout the subsequent processing. The high-pressure pump 102 is built so that it maintains a steady pre-set pressure at all times. The slurry is introduced at the top of the reactor vessel 110 while simultaneously withdrawing the water or whatever other material was in the reactor vessel 110 through valve 202. At this time the valves 104 and 202 are open. The pressure is maintained on the slurry in front of valve 104 by high pressure pump 102.

During the process water which filled condenser-exchanger vessel 204 above plunger 206 is bled off through the needle valve 222 and valve 226. The reaction time is regulated by the rate of bleed-off of the water through needle valve 222. The rate of flow is maintained so that the hot vapors from the reactor vessel 110 are condensed in the tubing 128 surrounded by cold water in the water tank 130. The rate of flow is adjusted so that the transmit time from the top of reaction vessel to the bottom of reaction vessel is equal to the desired reaction time. For example, a bleed-off rate of 2.8 cubic centimeters per minute will cause the slurry to pass through the reaction vessel 110 with a volume of about 173 cubic centimeters in approximately 1 hour.

After the reaction vessel 110 has been completely filled with the slurry, by withdrawing the water in a controlled fashion through valve 202, the rate of flow of the slurry through the reactor is thereafter maintained by releasing the water in a controlled fashion from above the plunger 206 in the condenser-exchanger vessel 204 through needle valve 222. At the start the plunger 206 is close to or at the bottom of the condenser-exchanger 204. As the slurry material passes through the reaction vessel 110 and into the condenser-exchanger vessel 204 the plunger 206 moves toward the top of the condenser-exchanger 204.

After condenser-exchanger 204 has been filled to a large extent with slurry, the valve 202 is closed and the valve 302 simultaneously opened. At this point the plunger 308 in condenser-exchanger vessel 306 is at the bottom of the vessel 306. As water is bled off through the needle valve 320, the reacted slurry now enters condenser-exchanger vessel 306.

While condenser-exchanger vessel 306 is being filled, condenser-exchanger vessel 204 can be emptied through valve 228 by pumping water in through the high pressure pump 216 and thereby driving the plunger 206 back to the bottom of the condenser-exchanger vessel 204. As soon as condenser-exchanger vessel 204 has been emptied valve 302 may close at the same time valve 202 is opened. While condenser-exchanger vessel 204 is being filled, condenser-exchanger vessel 306 can be discharged through valve 324 by pumping in water from high pressure pump 312 through valve 318 to drive the plunger 308 in the condenser-exchanger vessel 306 back down to the bottom of vessel 306.

The above cycling may be repeated as many times as desired and in this manner produce a continuous passage of the slurry through the reactor vessel 110.

The rate of heating around the reactor vessel 110 by elements 114, 116, 118, and 120 can be adjusted to maintain the continuously flowing slurry at a desired uniform temperature.

The above apparatus permits the kaolinite slurry to be subjected to high temperatures and pressures for any period of time ranging from a couple of minutes to hours. The apparatus may be operated continuously or batchwise. Further, the apparatus enables one to introduce suspended kaolinite clay particles under high pressures up to approximately 30,000 pounds per square inch, to be reacted at a constant high temperature up to approximately 1000° C. and to withdraw the slurried material from the reactor and return it to atmospheric pressure without the necessity of passing the slurried materials through such a small orifice as might disrupt the slurried particles mechanically and increase shear on the particles.

While the above description relates to a specific hydrothermal treatment apparatus particuarly suitable for carrying out the method of the present invention, it should be readily apparent to those skilled in the art that other reaction apparatus, capable of producing the required temperatures and pressures may be employed.

The following examples serve to illustrate the present invention but are not intended to limit it thereto. Unless otherwise stated, the hydrothermal treatment pressure employed was in the range of 4000 to 30,000 p.s.i. and typically was 5000 p.s.i. As known in the art, mineral identification may be accomplished by a series of tests which include chemical analysis, electron microscopy, differential thermal analysis and X-ray diffraction.

A general discussion of X-ray diffraction may be found in Van Nostrand's "International Encyclopedia of Chemical Science" at pp. 1223 and 1224. A more specific discussion may be found in "Elements of X-Ray Diffraction" by B. D. Cullity, Addison-Wesley Publishing Co., Inc., 1956, at pp. 78-102 and pp. 378-401 and in "The Powder Method and X-Ray Crystallography" by L. V. Azaroff and M. J. Buerger, McGraw-Hill Book Co., 1958, at pp. 4-17 and pp. 190-209.

In the following examples the X-ray diffraction method was used to identify the alumino-silica products. Also, and with reference to FIGS. 2-8, as indicated in the examples, electron micrographs were employed.

EXAMPLE 1

Figure 2:
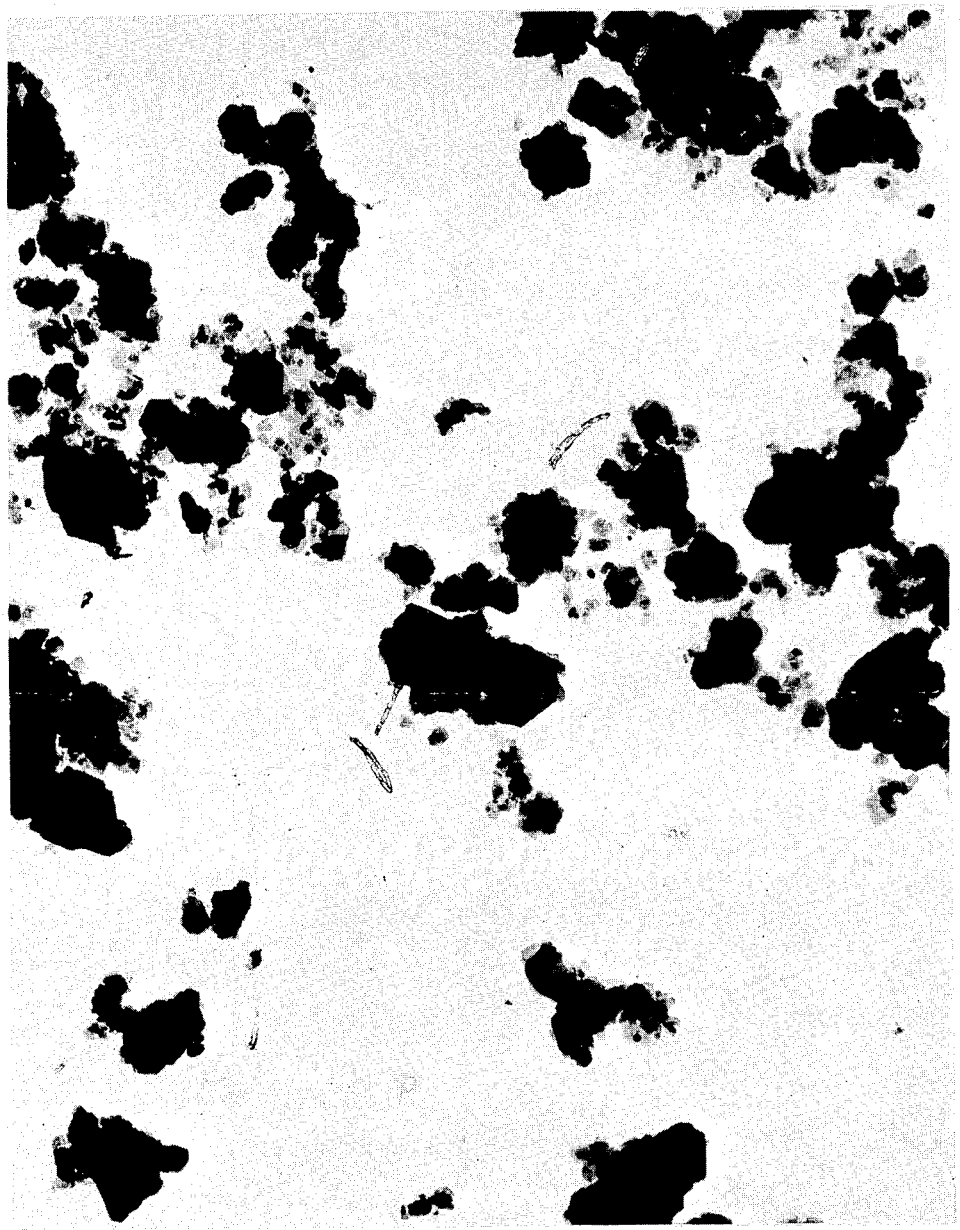
FIG. 2 is an electron micrograph of untreated kaolinite.

The apparatus employed in this example was substantially the same as that illustrated in FIG. 1. A 15% solids slurry of kaolinite was introduced into the hydrothermal reaction vessel and the slurry was hydrothermally treated in a continuous manner as described above. The temperature of the slurry was maintained at 425° C. with the retention time in the reacting being 2 hours. X-ray diffraction tests indicated no hydrothermal transformation of the kaolinite. A photomicrograph of untreated kaolinite at ×36,400 is shown in FIG. 2.

EXAMPLE 2

Figure 3:
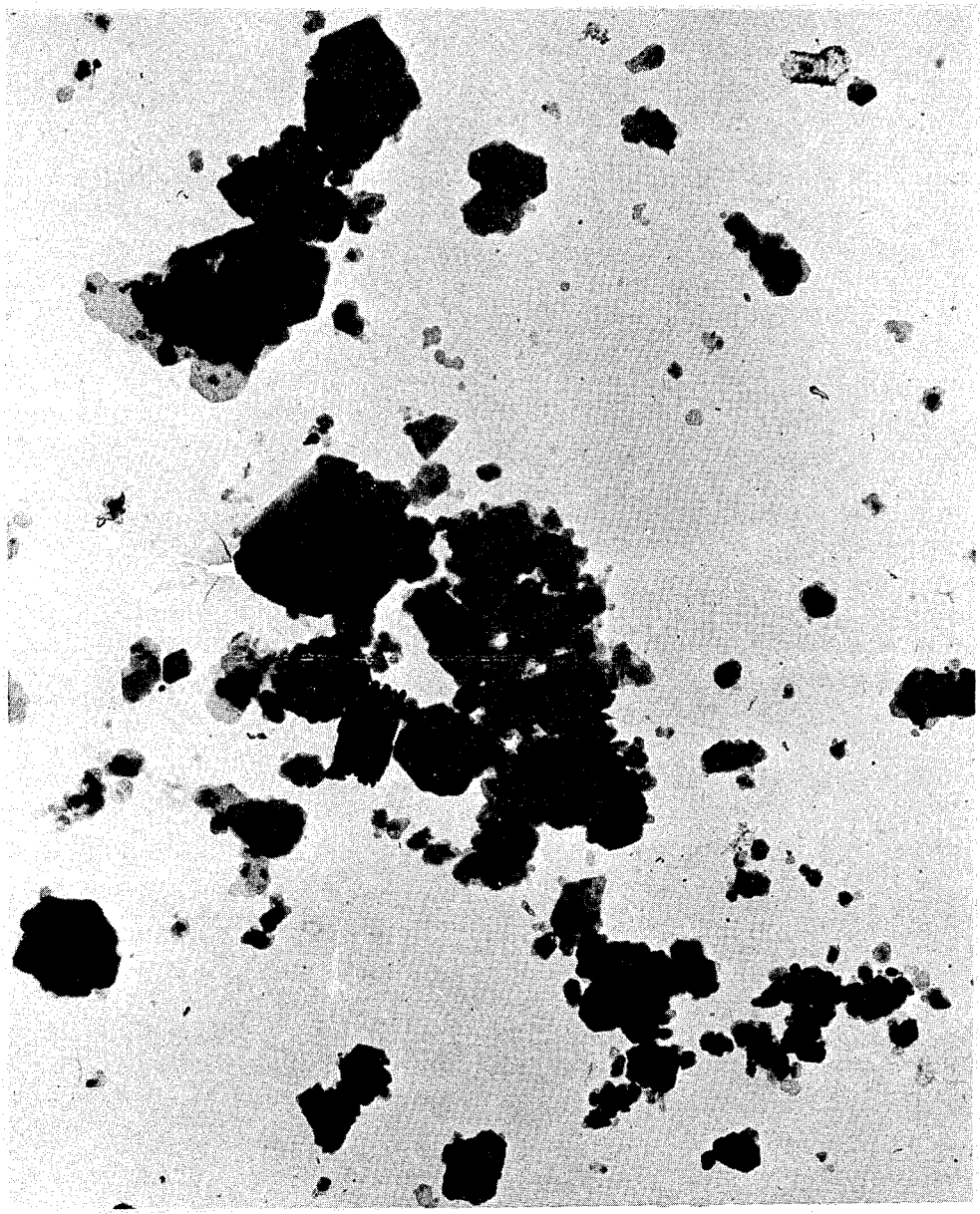
FIG. 3 is an electron micrograph of kaolinite and an alumino-silica transformation product producing an X-ray diffraction peak at 9.9 A.

A 15% solids slurry of kaolinite was hydrothermally treated in the manner described in Example 1 at 430° C. for 20 hours. The product as established by X-ray diffraction tests of a sample of solids from the slurry contained kaolinite and trace amounts of hydralsite and an aluminosilica transformation product producing an X-ray diffraction peak at 9.9 A. An electron micrograph at ×36,400 of the product of this example is shown in FIG. 3.

EXAMPLE 3

Example 2 was repeated except that a 25% solid slurry of kaolinite was treated at 430° C. for 25 hours. The product, as established by X-ray diffraction tests, was substantially the same as that of Example 2.

EXAMPLE 4

Figure 5:
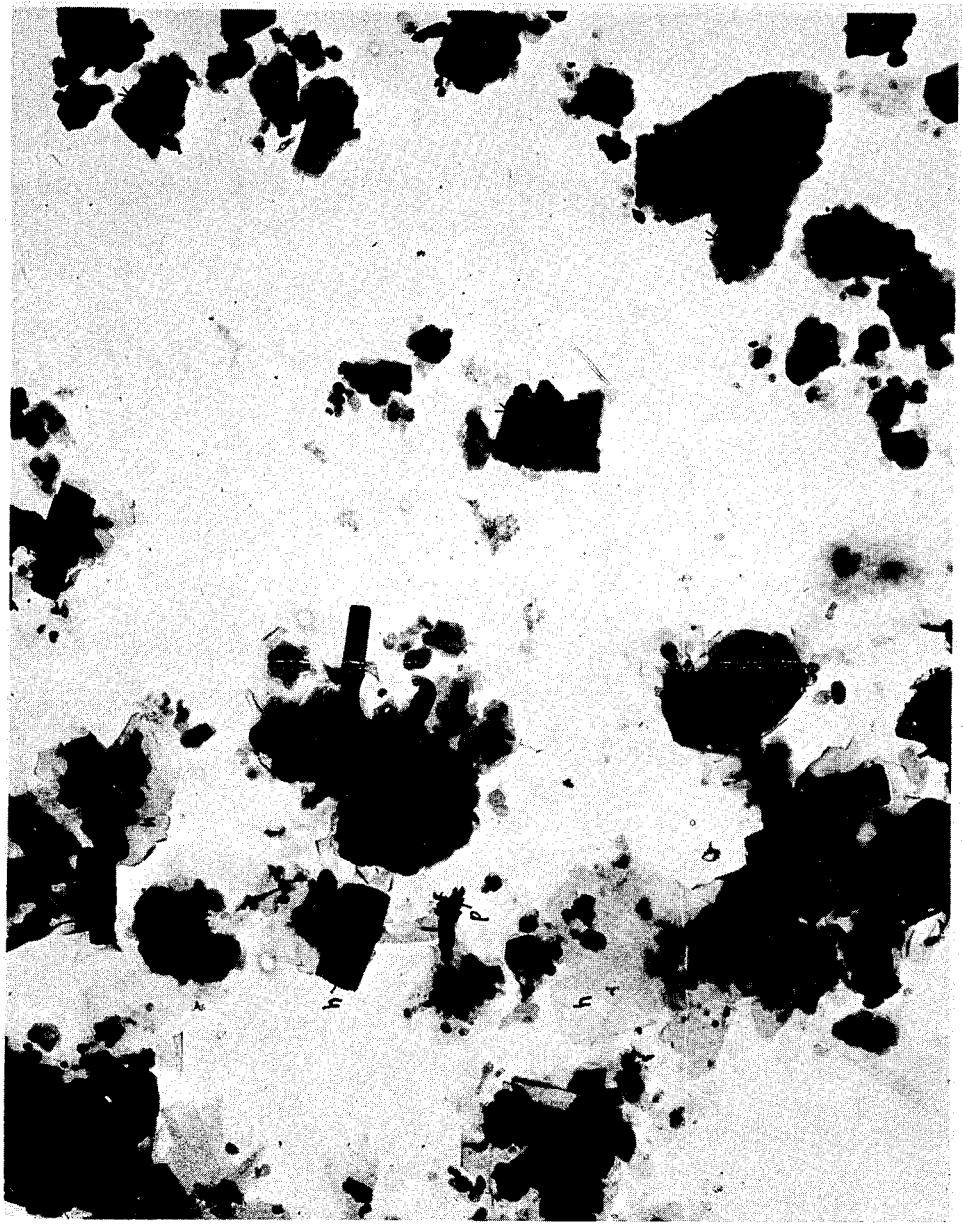
FIG. 5 is an electron micrograph of kaolinite (k), hydralsite (h), pyrophyllite (p) and an alumino-silica transformation product producing an X-ray diffraction peak at 9.9 A.

A 15% solids slurry of kaolinite was hydrothermally treated at 443° C. for 10 hours. The product, as established by X-ray diffraction tests, contained kaolinite, hydralsite and trace amounts of pyrophyllite and an alumino-silica transformation product producing an X-ray diffraction peak at 9.9 A. An electron micrograph at ×36,400 of the product of this example is shown in FIG. 5.

EXAMPLE 5

Figure 6:
FIG. 6 is an electron micrograph of kaolinite (k), hydralsite (h), pyrophyllite (p) and andalusite (a)

A 15% solids slurry of kaolinite was hydrothermally treated at 460° C. for 9.5 hours. The product, as established by X-ray diffraction tests, contained kaolinite, hydralsite, pyrophyllite and andalusite. An electron micrograph at ×36,400 of the product of this example is shown in FIG. 6.

EXAMPLE 6

Example 5 was repeated except that slurry was hydrothermally treated for 30 hours. The product contained hydralsite, pyrophyllite, andalusite and only trace amounts of kaolinite.

EXAMPLE 7

Figure 7:
FIG. 7 is an electron micrograph of hydralsite (h), pyrophyllite (p) and andalusite (a)

Example 5 was repeated execept that a 20% solids slurry was hydrothermally treated for 39.5 hours. The product contained hydralsite, pyrophyllite and andalusite. An electron micrograph at ×36,400 of the product of this example is shown in FIG. 7.

EXAMPLE 8

A 15% solids slurry of kaolinite was hydrothermally treated at 500° C. for 10 hours. The product, as established by X-ray diffraction tests, contained hydralsite, pyrophyllite, andalusite and trace amounts of mullite.

EXAMPLE 9

Figure 8:
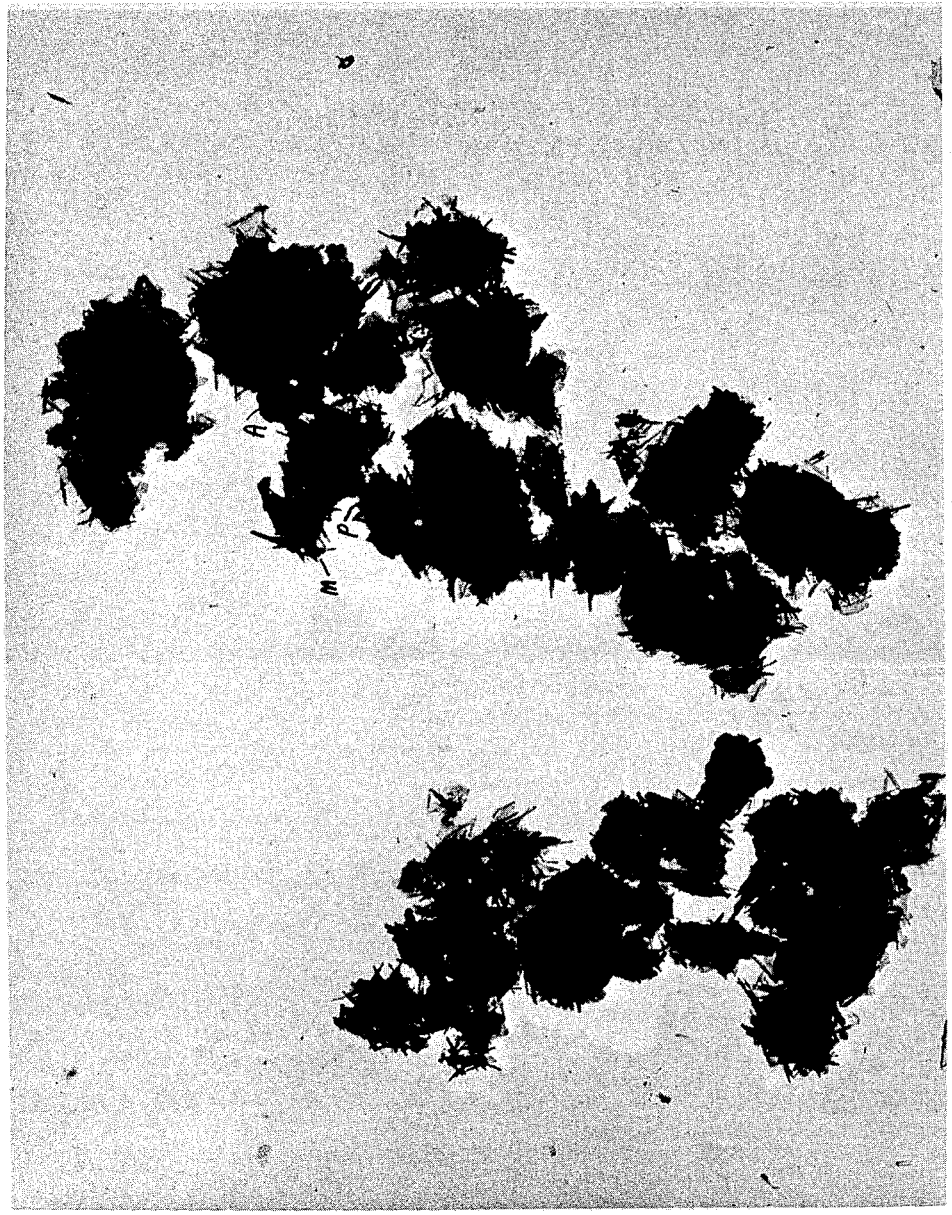
FIG. 8 is an electron micrograph of pyrophyllite (p), andalusite (a) and mullite (m).

Example 8 was repeated except that the slurry was hydrothermally treated at 543° C. for 18.5 hours. The product contained pyrophyllite, andalusite and mullite. An electron micrograph at ×36,400, of the product of this example is shown in FIG. 8.

EXAMPLE 10

Figure 4:
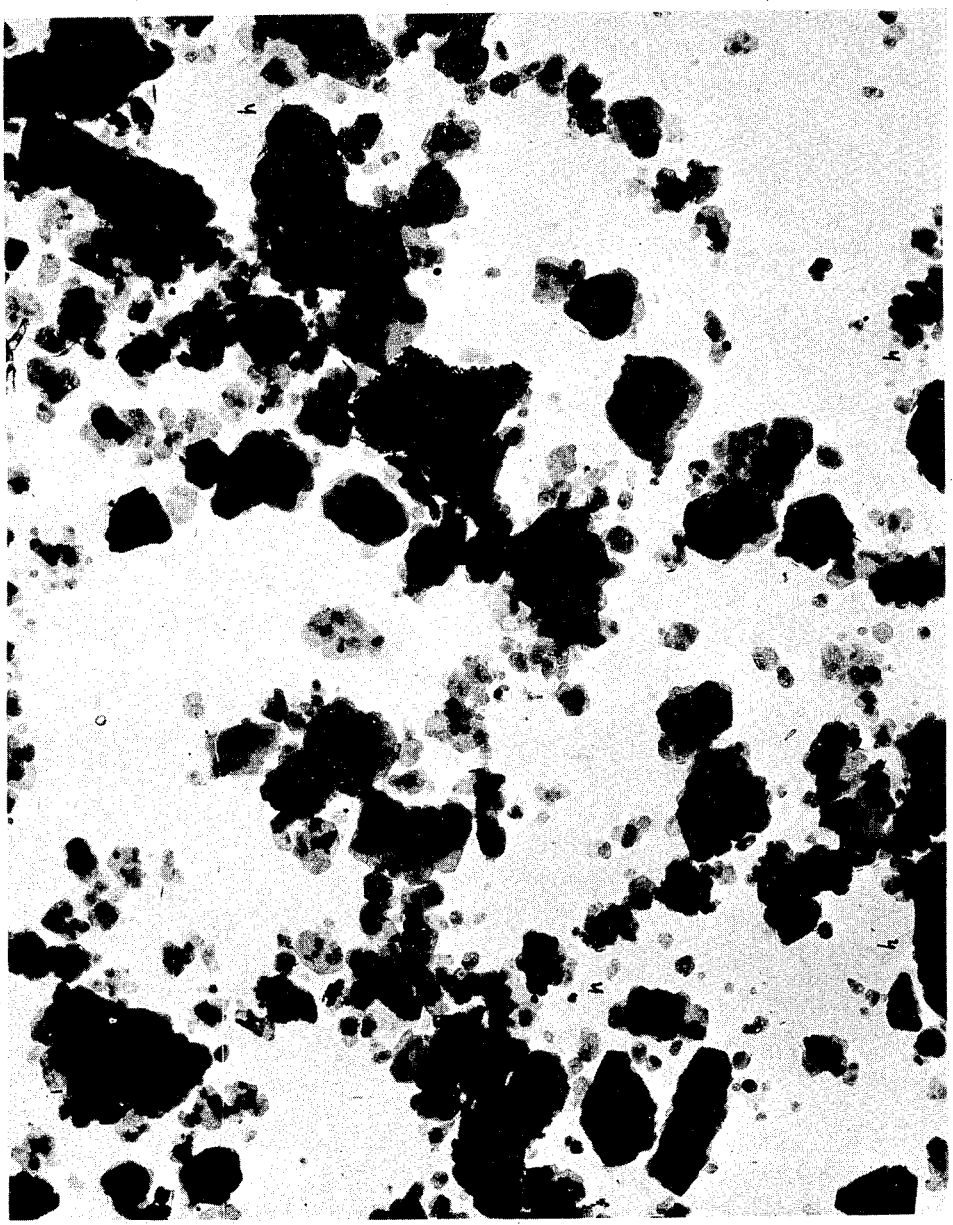
FIG. 4 is an electron micrograph of kaolinite and an alumino-silica transformation product producing an X-ray diffraction pattern having a broad peak at 17 A. and hydralsite (h)

A 15% solids slurry of kaolinite was hydrothermally treated at 430° C. for 20 hours. The product as established by X-ray diffraction tests contained kaolinite, a trace of hydralsite and a trace of an alumino-silica transformation product producing a broad X-ray diffraction peak at 17 A. An electron micrograph at ×36,400 of the product of this example is shown in FIG. 4.

EXAMPLE 11

A 15% solids slurry of kaolinite was hydrothermally treated at 460° C. for 3 hours. The product as established by X-ray diffraction tests contained kaolinite and traces of alumino-silica transformation products producing X-ray diffraction peaks at 17 A. and 9.9 A.

EXAMPLE 12

A 15% solids slurry of kaolinite was hydrothermally treated at 555° C. for 35 hours. The product as established by X-ray diffraction contained pyrophyllite, andalusite and mullite.

EXAMPLE 13

A 30% solids slurry of kaolinite was hydrothermally treated at 440° C. and 15,000 p.s.i. for 120 hours. The product produced as established by X-ray diffraction contained hydralsite, pyrophyllite, and a trace of an aluminosilica transformation product producing a broad X-ray diffraction peak at 17 A.

EXAMPLE 14

A 30% solids slurry of kaolinite was hydrothermally treated at 450° C. for 100 hours. The product produced, as established by X-ray diffraction, contained hydralsite and pyrophyllite.

EXAMPLE 15

A 30% solids slurry of kaolinite was hydrothermally treated at 520° C. for 120 hours. The product produced as established by X-ray diffraction contained hydralsite, pyrophyllite, andalusite and mullite.

EXAMPLE 16

A 70% solids slurry of kaolinite was hydrothermally treated at 445° C. for 121 hours. The product produced as established by X-ray diffraction contained hydralsite and pyrophyllite.

EXAMPLE 17

A 70% solids slurry of kaolinite was hydrothermally treated at 450° C. for 123 hours. The product produced as established by X-ray diffraction contained hydralsite, pyrophyllite, and andalusite.

EXAMPLE 18

A 100% solids batch of kaolinite was hydrothermally treated at 450° C. for 120 hours at a pressure of 15,000 p.s.i. The product produced as established by X-ray diffraction contained hydralsite and pyrophyllite.

EXAMPLE 19

A Georgia kaolin was made up to a 33% solids slurry and placed in a silver liner, which was then enclosed in a high pressure-high temperature autoclave. The autoclave was brought to an operating condition of 442° C. at 5,000 p.s.i. and maintained under these conditions for approximately 200 hours, then cooled and opened. The product produced as established by X-ray diffraction contained predominately hydralsite with an estimated 15% pyrophyllite.

EXAMPLE 20

The procedure of Example 19 was repeated except that the operating conditions were altered to provide a temperature of 450° C. The product produced as established by X-ray diffraction contained predominately hydralsite with pyrophyllite and a trace of andalusite.

EXAMPLE 21

A Georgia kaolin was made up to a 5% solids slurry and hydrothermally treated at 430° C., 4,000 p.s.i. for 30 minutes. The presence of the transformation product hydralsite was established by X-ray diffraction.

EXAMPLE 22

A Georgia kaolin was made up to an 8% solids slurry and hydrothermally treated at 430° C., 4,000 p.s.i. for 30 minutes. The presence of the transformation product hydralsite was established by X-ray diffraction.

The results of the above examples are summarized in the following tables:

TABLE I.—HYDROTHERMAL TRANSFORMATION OF KAOLIN

| Example number | Percent solids | °C. | P.s.i. | Time (hrs.) | Kaolin (002) remaining | Transformation products | | | | |
|---|---|---|---|---|---|---|---|---|---|---|
| | | | | | | 9.9A | Broad 17A | Hydralsite 10°2θ | Pyrophyllite 9.5°2θ | Andalusite 16°2θ | Mullite 16.5°2θ |
| 21 | 5 | 430 | 4,000 | 0.5 | Much | | | Trace | | | |
| 22 | 8 | 430 | 4,000 | 0.5 | do | | | do | | | |
| 1 | 15 | 425 | 5,000 | 2 | All | | | | | | |
| 2 | 15 | 430 | 5,000 | 20 | Yes | | Trace | Trace | | | |
| 10 | 15 | 430 | 5,000 | 20 | Yes | | | Trace | do | | |
| 4 | 15 | 443 | 5,000 | 10 | Yes | | Trace | Much | Little | | |
| 11 | 15 | 460 | 5,000 | 3 | Yes | | do | Trace | | | |
| 5 | 15 | 460 | 5,000 | 9.5 | Yes | | | Very much | Much | Much | |
| 6 | 15 | 460 | 5,000 | 30 | Trace | | | do | do | do | Trace. |
| 8 | 15 | 500 | 5,000 | 10 | | | | Much | do | do | Moderate. |
| 9 | 15 | 543 | 5,000 | 18.5 | | | | | do | Moderate | Do. |
| 12 | 15 | 555 | 5,000 | 35 | | | | | do | do | |
| 7 | 20 | 460 | 5,000 | 39.5 | | | | Much | do | Much | |
| 3 | 25 | 430 | 5,000 | 25 | Yes | | Trace | Trace | | | |
| 13 | 30 | 440 | 15,000 | 120 | | | Trace | Much | Little | | |
| 14 | 30 | 450 | 5,000 | 100 | | | | do | Moderate | | |
| 15 | 30 | 520 | 5,000 | 120 | | | | Moderate | Little | Moderate | Do. |
| 19 | 33 | 442 | 5,000 | 200 | | | | Much | Much | Trace | |
| 20 | 33 | 450 | 5,000 | 200 | | | | do | do | do | |
| 16 | 70 | 445 | 5,000 | 121 | | | | do | Moderate | | |
| 17 | 70 | 450 | 5,000 | 123 | | | | do | do | Moderate | |
| 18 | 100 | 450 | 15,000 | 120 | | | | do | do | | |

TABLE II.—OTHER EXAMPLES OF HYDROTHERMAL TRANSFORMATION OF KAOLIN

| Percent solids | °C. | P.s.i. | Time (hrs.) | Kaolin (002) remaining | Transformation products | | | | | |
|---|---|---|---|---|---|---|---|---|---|---|
| | | | | | 9.9A | Broad 17A | Hydralsite 10°2θ | Pyrophyllite 9.5°2θ | Andalusite 16°2θ | Mullite 16.5°2θ |
| 15 | 435 | 5,000 | 12 | Yes | | | Trace | | | |
| 15 | 435 | 5,000 | 22 | Yes | | Trace | Trace | do | | |
| 15 | 443 | 5,000 | 28 | Yes | | do | do | Much | Little | |
| 15 | 450 | 5,000 | 51 | Little | | | | do | Moderate | |
| 15 | 460 | 5,000 | 1 | Yes | | Trace | Trace | | | |
| 15 | 460 | 5,000 | 3 | Trace | | | Much | Much | Much | |
| 30 | 435 | 5,000 | 26 | Yes | | Trace | Trace | | | |
| 30 | 441 | 5,000 | 120 | | | | Much | Moderate | | |
| 30 | 446 | 5,000 | 120 | | | | Very much | do | Trace | |
| 30 | 450 | 15,000 | 95 | | | | Much | do | | |
| 30 | 451 | 5,000 | 121 | Trace | | | Very much | do | | |
| 30 | 501 | 5,000 | 120 | | | | Much | do | Moderate | Moderate. |
| 30 | 524 | 5,000 | 120 | | | | Moderate | Little | do | Do. |
| 70 | 440 | 5,000 | 123 | Trace | | | Much | Moderate | | |
| 100 | 450 | 5,000 | 126 | do | | | do | do | | |

The above characterizations of the quantities of the materials produced are based on X-ray diffraction of the reaction products and the comparative intensities of selected X-ray diffraction lines of the products characteristic pattern.

The products produced above have been found particularly suitable for use as filler and coating pigments, among their other uses. For example, pyrophyllite has been found useful for a variety of purposes in ceramics, paint, roofing, insecticides and refractories. Mullite has been found useful in smelting, glass making and boiler settings.

A quantity of hydralsite produced in accordance with the present invention from a Georgia kaolin at 70% solids, 450° C., 5,000 p.s.i. and 3 days reaction time was evaluated in a 7.5% coating application as follows.

Color properties:
    Brookfield viscosity, 20 r.p.m. _____ 3400
    Hercules _____ 15.8
    Color Solids, percent _____ 53.0
Coated properties:
    G.E. brightness _____ 71
    Gloss _____ 40.5
    Opacity _____ 89
    Whiteness factor _____ 56
    MAN print quality _____ 78
    Printed gloss _____ 52

It should be noted that the apparatus shown in FIG. 1 may be adapted to handle substantially dry, bulk kaolinites and pigments for continuous processing by use of suitable screw means or by use of pressure differential and extrusion means. It should also be understood that any of a number of batch apparatuses may be employed in the production of the hydrothermal transformation products of the present invention.

The materials referred to above comprising the principal phases of the $Al_2O_3$-$SiO_2$-$H_2O$ system have the following general composition:

|  | $SiO_2$ | $Al_2O_3$ | $H_2O$ |
|---|---|---|---|
| Kaolin ($Al_2O_3 \cdot 2SiO_2 \cdot 2H_2O$) | 46.5 | 39.5 | 14 |
| Hydralsite ($2Al_2O_3 \cdot 2SiO_2 \cdot xH_2O$) | 38.3 | 56.7 | 10 |
| Hydralsite | 35.1 | 59.5 | ≈5.3 |
| Pyrophyllite ($2Al_2O_3 \cdot 8SiO_2 \cdot 2H_2O$) | 66.7 | 28.3 | 5.0 |
| Andalusite ($Al_2SiO_5$) | 36.8 | 63.2 | -------- |
| Mullite ($3Al_2O_3 \cdot 2SiO_2$) | 28.2 | 71.8 | -------- |
| Halloysite | 40.8 | 34.7 | 24.5 |
| Diaspore |  | 85.0 | 15.0 |
| Gibbsite |  | 65.4 | 34.6 |
| Al-montmorillonite | 45–47 | 20–28 | 22 |

The upper limit on temperatures known to be operative for the process of the present invention is largely determined by materials-apparatus limitations but is on the order to 1000° C. Once equilibrium is established for the production of a given product or group of products the major effect of longer retention times is its affect on crystal size. It has also been noted that particle size affects the reaction rate. However, these factors are not considered critical to the successful operation of the present invention in accord with the teaching provided herein.

While the invention has been described with reference to its preferred embodiments herein, it will be understood by those skilled in the art that various changes may be made and equivalents substituted for elements and steps thereof without departing from the true spirit and scope of the invention. In addition, many modifications may be made to adapt a particular material or situation, such as batch or continuous processing, to the teaching of the present invention without departing from its essential teachings.

What is claimed is:

1. A method for producing alumino-silica products comprising maintaining kaolinite at a temperature of at least 430° C. and a pressure of at least 4000 pounds per square inch for at least 30 minutes to produce at least one of the alumino-silica transformation reaction products produced by the hydrothermal transformation of said kaolinite selected from the group consisting of hydralsite, pyrophyllite, andalusite, mullite, an aumino-silica transformation reaction product producing an X-ray diffraction peak at 9.9 A., and an alumino-silica transformation reaction product producing an X-ray diffraction peak at 17 A.

2. A method for producing alumino-silica products comprising maintaining kaolinite at a temperature of at least 430° C. and a pressure of at least 4000 pounds per square inch for at least 30 minutes to produce alumino-silica transformation reaction products by hydrothermal transformation of said kaolinite wherein said reaction product is hydralsite.

3. A method for producing alumino-silica products comprising maintaining kaolinite at a temperature in excess of 450° C. and a pressure of at least 4000 pounds per square inch for over 100 hours to produce at least one of the alumino-silica transformation reaction products produced by the hydrothermal transformation of said kaolinite selected from the group consisting of hydralsite and pyrophyllite.

4. A method for producing alumino-silica products comprising forming an aqueous slurry containing 5–99% by weight kaolinite solids; heating said slurry to a temperature of at least 430° C. in an effectively closed reaction zone and thereby providing in the reaction zone a pressure of at least 4000 pounds per square inch, retaining said slurry in the reaction zone at said temperature and pressure for at least 30 minutes and recovering the alumino-silica reaction products produced by the hydrothermal transformation of said kaolinite from the reaction zone.

5. The method of claim 4 wherein the slurry contains at least 15% kaolinite solids and the temperature is maintained in excess of 440° C. for at least 10 hours to produce at least one of the materials selected from the group consisting of hydralsite, pyrophyllite, and andalusite.

6. The method of claim 4 and further comprising maintaining a temperature in the range of from 450° C. to 560° C. in said reaction zone while retaining said slurry in said reaction zone for a period of at least 3 hours, thereby forming a transformation product comprising at least one of the alumino-silica materials selected from the group consisting of hydralsite, pyrophyllite, andalusite, and mullite.

7. The method of claim 4 and further comprising maintaining a temperature of at least 480° C. in said reaction zone for a period of at least 10 hours thereby forming a transformation product comprising at least one of the alumino-silica materials selected from the group consisting of hydralsite, pyrophyllite, andalusite, and mullite.

8. The method of claim 7 which further comprises separating the alumino-silica materials produced from each other.

9. The method of claim 4 wherein the temperature is maintained between 435° C. and 535° C. to produce hydralsite.

10. The method of claim 4 wherein the temperature is at least 450° C. to produce andalusite.

11. The method of claim 4 wherein the temperature is at least 480° C. to produce mullite.

12. The method of preparing an alumino-silica transformation product comprising predominately hydralsite comprising the steps of heating kaolinite to a temperature in the range of 435° C. to 535° C. and maintaining said temperature for approximately 30 minutes while simultaneously applying pressure of at least 400 pounds per square inch.

13. The method of claim 12 which further comprises forming an aqueous slurry containing from 5–90% by weight kaolinite solids and following the reaction of claim 9 separating said hydralsite from said slurry and from any other alumino-silica transformation products produced.

References Cited

UNITED STATES PATENTS

| 2,904,267 | 9/1959 | Lyons | 241—26 |
| 3,226,252 | 12/1965 | Hemstock | 106—288 B X |
| 3,301,691 | 1/1967 | Hemstock et al. | 106—288 B X |

EDWARD STERN, Primary Examiner

U.S. Cl. X.R.

106—288 B; 423—327